United States Patent [19]
Jauregui et al.

[11] Patent Number: 5,768,366
[45] Date of Patent: Jun. 16, 1998

[54] HIGH VOLTAGE MESSAGE WAITING CIRCUIT

[75] Inventors: Mario E. Jauregui, San Bruno; Spencer L. Hermanson, San Jose; Ronald S. Lesniak, Santa Cruz; Elaine C. He, San Jose, all of Calif.

[73] Assignee: Teledex Corporation, San Jose, Calif.

[21] Appl. No.: 832,485

[22] Filed: Apr. 2, 1997

[51] Int. Cl.[6] .................................................. H04M 9/00
[52] U.S. Cl. .................... 379/396; 379/164; 379/373; 379/396
[58] Field of Search .............................. 379/376, 379, 379/387, 396, 373, 372, 350, 156, 164, 67, 88, 89, 377, 252

[56] References Cited

U.S. PATENT DOCUMENTS

| | | | |
|---|---|---|---|
| 3,651,270 | 3/1972 | Lee, Jr. et al. | 379/376 |
| 3,951,248 | 4/1976 | Feiner et al. | 379/164 |
| 3,971,898 | 7/1976 | Hijikata et al. | 379/396 |
| 4,072,825 | 2/1978 | McLay et al. | 379/33 |
| 4,086,441 | 4/1978 | Ullakko et al. | 379/376 |
| 4,256,928 | 3/1981 | Lesea et al. | 379/214 |
| 4,394,544 | 7/1983 | De Leon | 379/396 |
| 4,648,109 | 3/1987 | Boeckmann | 379/376 |
| 5,280,523 | 1/1994 | Lee | 379/396 |
| 5,327,493 | 7/1994 | Richmond et al. | 379/396 |
| 5,557,666 | 9/1996 | Kim | 379/396 |
| 5,664,008 | 9/1997 | Bossi et al. | 379/396 |

FOREIGN PATENT DOCUMENTS 62-160859(A) 7/1987 Japan .................. H04M 3/42

*Primary Examiner*—Krista Zele
*Assistant Examiner*—Jacques M. Saint-Surin
*Attorney, Agent, or Firm*—Hopkins & Carley; Donald J. Pagel

[57] ABSTRACT

A message waiting circuit comprised of a pair of electrical leads which carry a message waiting signal, a capacitor for storing electrical energy extracted from the message waiting signal, a transistor for allowing the capacitor to charge when the message waiting signal is within a predetermined range; a Darlington transistor for causing the capacitor to discharge; and a light emitting diode (LED) which emits light when the capacitor discharges. The flashing LED indicates that a message is waiting for a user of the telephone set associated with the message waiting circuit. Approximately ten to twenty-five message waiting circuits and associated telephone sets can be connected to a single telephone line.

21 Claims, 4 Drawing Sheets

1

HIGH VOLTAGE MESSAGE WAITING CIRCUIT

TECHNICAL FIELD

The present invention relates to a message waiting circuit for use in a telephone set and more particularly to a message waiting circuit that uses a capacitor to store power extracted from a message waiting signal generated by a PBX and which uses the stored power to light an LED associated with the telephone set.

BACKGROUND INFORMATION

Message waiting lamps are a common feature on hotel or motel telephones and on some business telephones. The message waiting lamp allows an operator, like a hotel operator, to alert a guest or other user that a message has been left for the guest. The message could be of any format, such as a voice message, a fax or a text message. The guest or other user typically will then call the operator to retrieve the message or access an automated system in order to retrieve the message.

The most common type of message waiting signal currently used in analog telephones, comes from a private branch exchange (PBX) system applying a high voltage signal to the telephone line. The high voltage signal is used to light a neon bulb in the telephone. In other types of PBX systems, the high voltage signal is replaced by a pulsed message waiting signal, or with a reversed polarity message waiting signal, all of which are used to activate a message waiting light.

A problem with these approaches is that the amount of power needed to light the neon bulbs can be relatively large, especially if more than one or two telephone sets are connected to a single line. However, the trend in the hotel business, as well as in other businesses, is to increase the number of telephone sets attached to a single line. It is not unusual to have five to ten telephone sets attached to a single line. The reasons for the multiplicity of telephone sets being used include the following: In luxury suites, it is a convenience to have a telephone set at many locations within the suite. For example, on one or more desks, by one or more bedsides, on one or more coffee tables and in one or more bathrooms. Additionally, in a business or luxury suite, it may be desirable to have a number of telephone sets available for use with modems and/or fax machines.

With systems of the prior art, five or ten telephone sets could be connected to a single line, but the message waiting light would only light up on one or two of the telephone sets. The reason for this is that the neon lamp draws so much power that the message waiting signal is depleted by only one or two of the phones.

In telephone systems of the prior art, it is known that the neon lamp can be replaced with a light emitting diode (LED). For example, U.S. Pat. No. 4,648,109 (issued Mar. 3, 1987) discloses a message waiting circuit that utilizes an LED that utilizes one milliampere or less of current. Similarly, U.S. Pat. No. 3,951,248 (issued Apr. 20, 1976) and U.S. Pat. No. 4,072,825 (issued Feb. 7, 1978) disclose message waiting circuits that include an LED and a capacitor. However, none of the prior art discloses a circuit that allows numerous telephones with message waiting lights to be attached to a single telephone line, and in which the message waiting light is activated by commonly used message waiting signals.

SUMMARY OF THE INVENTION

Briefly, the present invention comprises a message waiting circuit comprised of an input means that allows a message waiting signal generated by a private branch exchange (PBX) telephone system to be received by the message waiting circuit; an energy storage means for storing electrical energy extracted from the message waiting signal; a first circuit means for allowing the energy storage means to charge when the message waiting signal is within a predetermined range; a second circuit means for causing the energy storage means to discharge; and a light emitting means, such as a light emitting diode (LED), which emits light when the energy storage means discharges, thereby indicating that a message is waiting for a user of a telephone set.

The principal advantage of the message waiting circuit of the present invention is that it draws very little current from the message waiting signal generated by the PBX. This means that as many as ten to eighteen telephone sets can be connected to a single telephone line when a high voltage message waiting signal is present and still have the message waiting light on each phone set be activated by the message waiting signal. In the preferred embodiment, the message waiting circuit is used with PBX systems that emit a 120 volt direct current message waiting signal. However, the circuit can also be used with pulsed type message waiting signals and with reversed polarity type message waiting signals.

DESCRIPTION OF THE PREFERRED EMBODIMENTS

Figure 1:
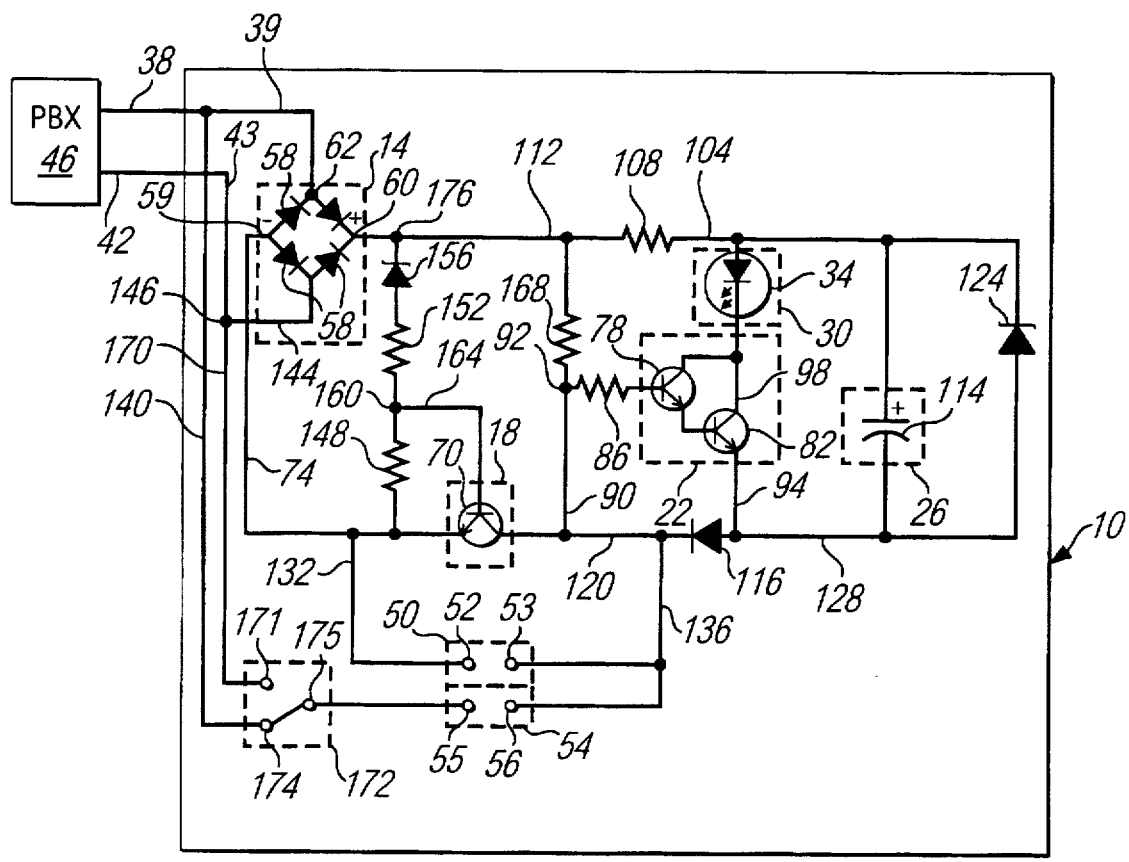
FIG. 1 is a circuit diagram of a high voltage message waiting circuit according to the present invention.

FIG. 1 illustrates a high voltage message waiting circuit 10 comprised of a rectifier means 14, a first circuit means 18, a second circuit means 22, an energy storage means 26 and a low voltage light source 30, such as a light emitting diode (LED) 34. A first lead 38 and a second lead 42 are connected to the circuit 10. A lead 39, which is a portion of the lead 38, extends into the message waiting circuit 10. Similarly, a lead 43, which is a portion of the lead 42, extends into the message waiting circuit 10. The first lead 38 is the "TIP" lead that is connected to a private branch exchange (PBX) 46. The second lead 42 is the "RING" lead connected to the PBX 46. A first switch means 50 is connected to the circuit 10 to provide an electrical path that bypasses the first circuit means 18. The switch means 50 includes a first contact 52 and a second contact 53. A second switch means 54 is connected to the circuit 10 so as to provide an electrical path that bypasses both a terminal of the rectifier means 14 and the first circuit means 18. The switch means 54 includes a first contact 55 and a second contact 56.

The PBX 46 generates a message waiting signal, such as a minus 120 volt spike which is transmitted over the second lead 42. The rectifier means 14 comprises a circuit element that divides the message waiting signal into positive and negative voltage components. In the preferred embodiment, the rectifier means 14 comprises a plurality of diodes 58 connected in series to provide the rectifying function. The rectifier means 14 includes a negative terminal 59 and a positive terminal 60. The lead 38 is connected to a node 62 of the rectifier means 14 by the lead 39. The first circuit means 18 comprises a switch such as an NPN transistor 70. A lead 74 connects the negative terminal 59 of the rectifier means 14 to the emitter of the transistor 70.

The second circuit means 22 comprises a composite transistor such as Darlington transistor comprised of a first NPN transistor 78 and a second NPN transistor 82. A resistor 86 limits the voltage applied to the base of the transistor 78. A lead 90 connects the collector of transistor 70 to a node 92. The resistor 86 is connected between the node 92 and the base of the transistor 78. The emitter of the transistor 78 is connected to the base of the transistor 82, and the emitter of the transistor 82 is connected to a lead 94. The collectors of the transistors 78 and 82 are both connected to a lead 98 which is connected to the low voltage light source 30. The lead 94 is connected to the energy storage means 26. The energy storage means 26 and the low voltage light source 30 are connected to a lead 104 which is connected to a resistor 108. The positive terminal 60 of the rectifier means 14 is connected to the resistor 108 by a lead 112. In the preferred embodiment, the energy storage means 26 comprises a capacitor 114, such as a ten microfarad capacitor.

A diode 116 is connected to the collector of the transistor 70 by a lead 120 and to a Zener diode 124 by a lead 128. The first switch means 50 is connected to the lead 74 by a lead 132 and to the lead 120 by a lead 136. The second switch means 54 is connected to the lead 38 by a lead 140 and to the lead 120 by the lead 136. The lead 42 is connected to the rectifying means 14 by a lead 144 at a node 146. The lead 43 connects the lead 42 to the node 146.

A resistor 148, a resistor 152 and Zener diode 156 are connected in series between the leads 74 and 112. The base of the transistor 70 is connected to a node 160 positioned between the resistors 148 and 152 by a lead 164. A resistor 168 is positioned between the lead 90 and the lead 112. A lead 170 connects the node 146 to a contact 171. A third switch means 172 is positioned between the lead 140 and the second switch means 54. The switch means 172 comprises a contact 174, a contact 175 and the contact 171. A node 176 is positioned between the resistor 108 and the rectifier means 14.

Figure 2:
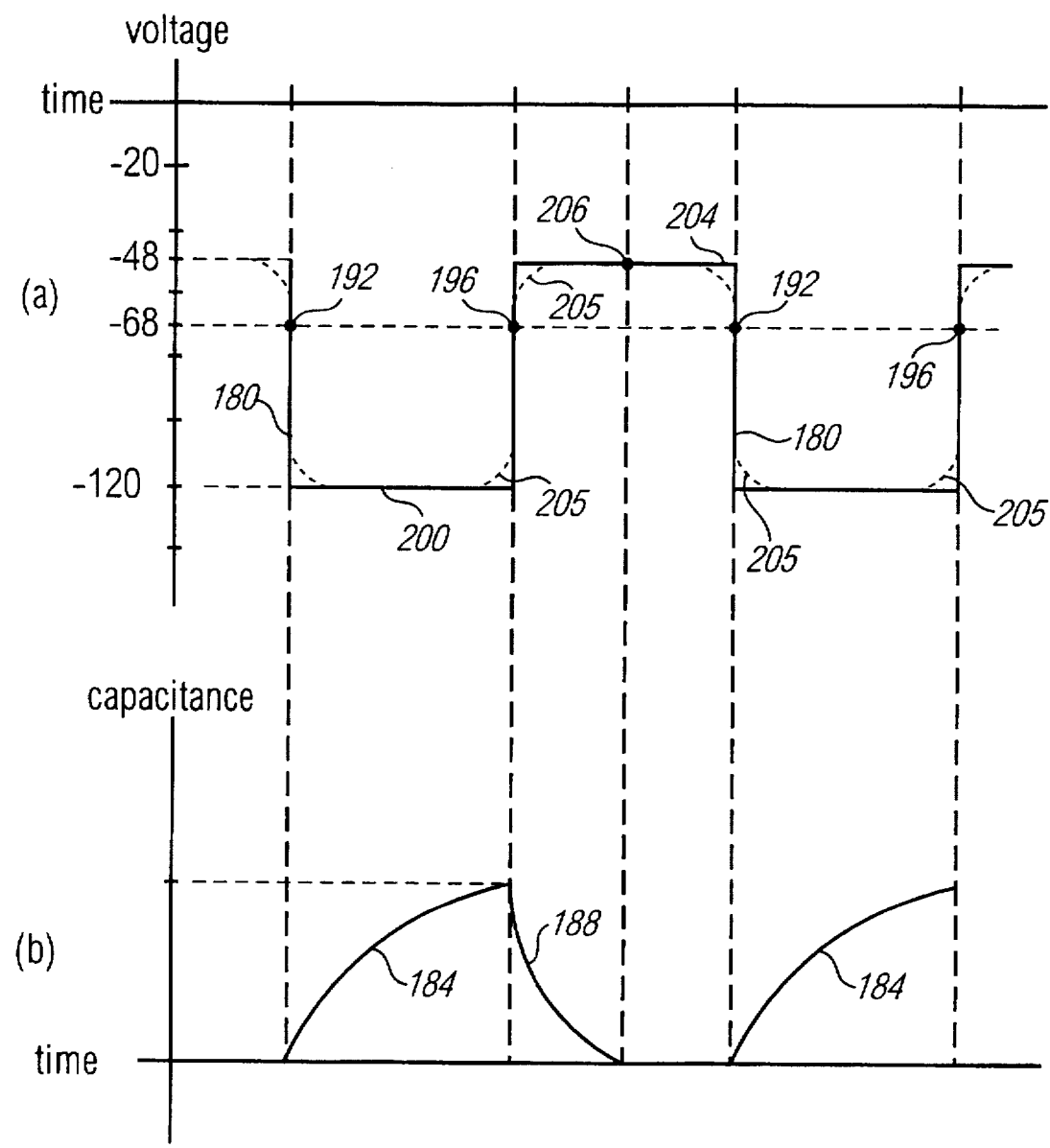
FIG. 2(a) is a wave diagram illustrating a high voltage message waiting signal.
FIG. 2(b) is a wave diagram illustrating how the capacitor charges in response to the high voltage message waiting signal.

FIG. 2(a) and FIG. 2(b) illustrate the relationship between a message waiting signal 180, a capacitor charging curve 184 and a capacitor discharging curve 188. FIG. 2(a) illustrates that in a typical PBX system, the potential difference between the leads 38 and 42 will be minus 48 volts. The message waiting signal 180 is a high voltage pulse of about minus 120 volts. A pair of points 192 and 196 indicate the points on the signal 180 where the voltage is about minus 68 volts. A region 200 indicates the period of time where the signal 180 reaches the maximum voltage of about −120 volts. A region 204 indicates the period of time where the signal 180 returns to −48 volts. Of course, in reality the signal 180 may not be a perfect square wave and may have rounded edges as is indicated by the curves 205. A point 206 indicates the approximate midpoint of the region 204.

FIG. 2(b) illustrates that the capacitor 114 (shown in FIG. 1) charges during the interval of time that the message waiting signal 180 has a value of about −68 volts to −120 volts (i.e. when the signal 180 is in the region 200 between the points 192 and 196) as is shown by the capacitor charging curve 184. The capacitor discharging curve 188 indicates that the capacitor 114 discharges during the interval of time that the message waiting signal 180 has a value of about −68 volts to about −48 volts (i.e. when the signal 180 is in the region 204 between the points 196 and 206). Generally, the region 204 is long enough that the capacitor 114 will be completely discharged before the charging cycle begins again.

Figure 3:
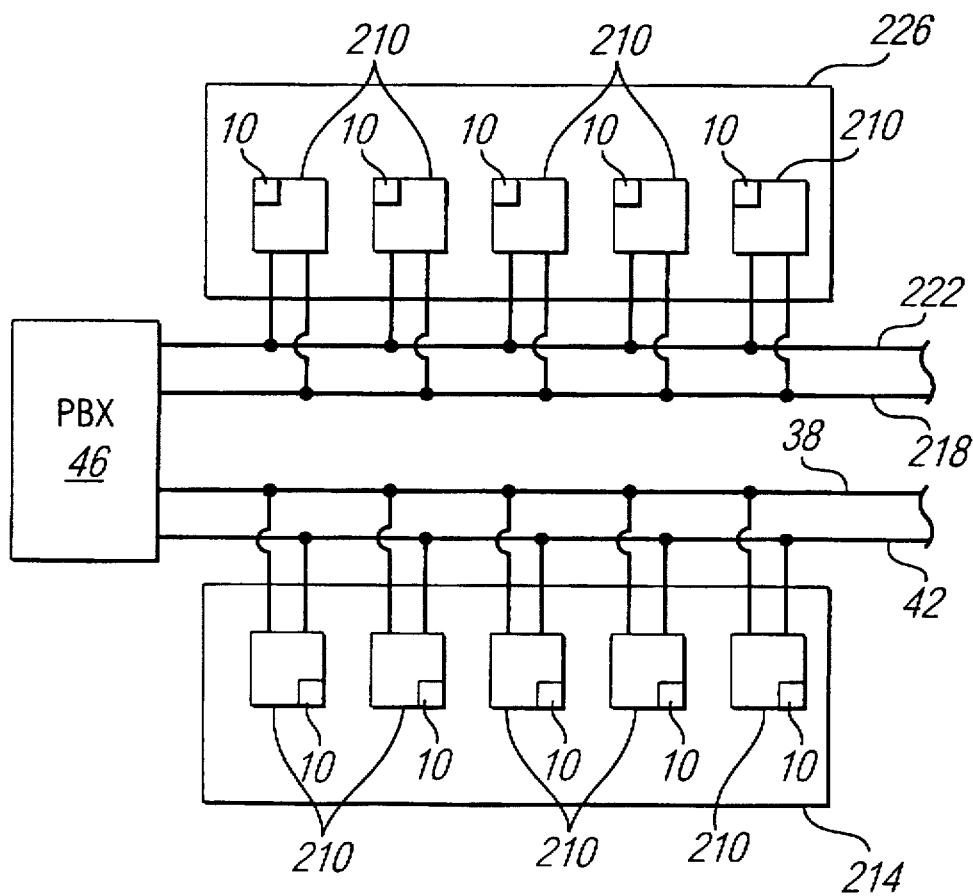
FIG. 3 is a block diagram showing a plurality of telephone sets with message waiting circuits connected to a PBX.

FIG. 3 illustrates a plurality of telephone sets 210 connected in parallel to the leads 38 and 42. In the preferred embodiment, the leads 38 and 42 extend to a single hotel or motel suite 214 and each of the telephone sets 210 connected to the leads 38 and 42 are located in the suite 214. Each of the telephone sets 210 include the circuit 10 which is connected to the leads 38 and 42 in the manner illustrated in FIG. 1. A second set of Tip and Ring leads 218 and 222 extend to a suite 226 and a plurality of telephone sets 210 are connected in parallel to the leads 218 and 222. Each of the telephone sets 210 connected to the leads 218 and 222 include the circuit 10.

Figure 4:
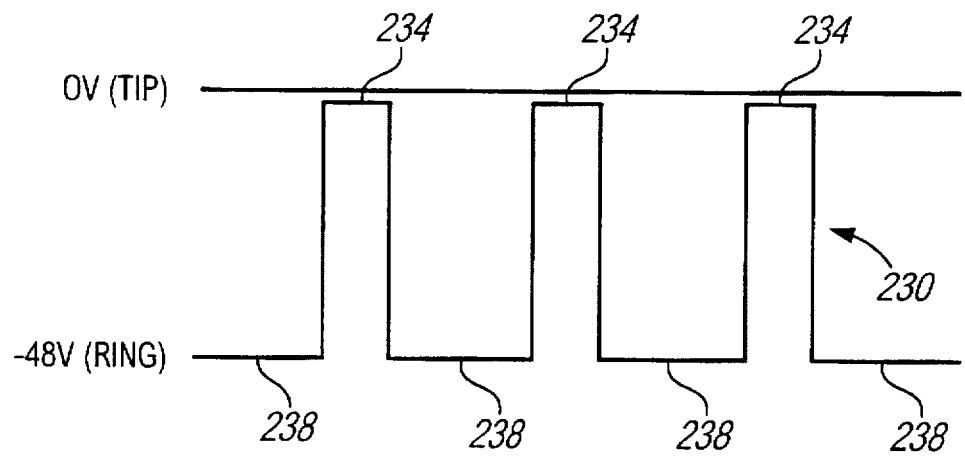
FIG. 4 is a wave diagram illustrating a pulsed message waiting signal.

FIG. 4 illustrates a pulsed message waiting signal 230. The signal 230 is basically a square wave having an upper part 234, which corresponds to approximately zero voltage, and a lower part 238, which corresponds to a voltage of approximately minus forty-eight volts. Of course, in reality, the signal 230 may have curved edges as was explained previously with respect to FIG. 2(a). Hence, the signal 230 comprises a series of pulses having a magnitude of approximately forty-eight volts. With the pulsed message waiting signal 230, the energy storage means 26 charges when the lower part 238 of the signal 230 is present and discharges when the upper part 234 is present.

Figure 5:
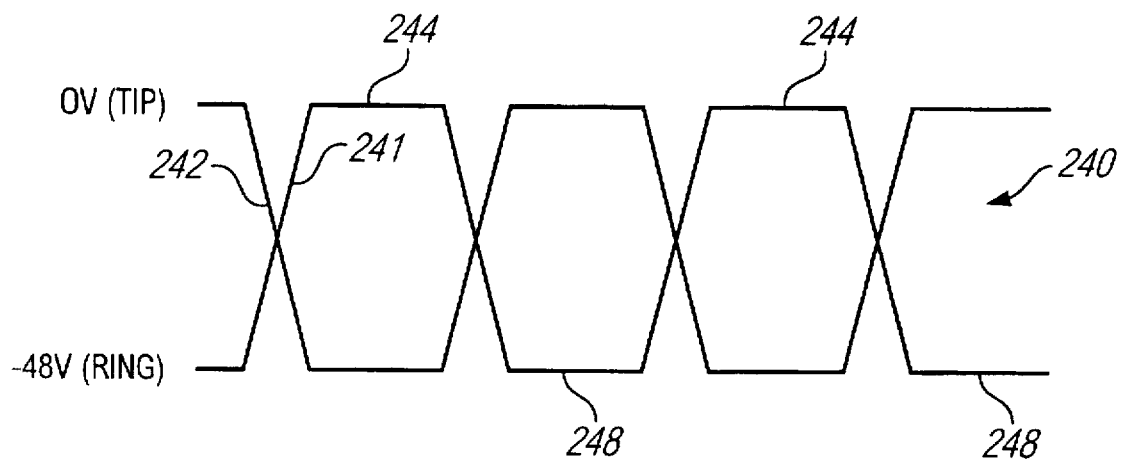
FIG. 5 is a wave diagram illustrating a reversed polarity current message waiting signal.

FIG. 5 illustrates a reversed polarity message waiting signal 240. The signal 240 comprises a ring signal 241 and a tip signal 242. The signal 241 alternates between minus forty-eight volts and zero volts. The signal 242 also alternates between minus forty-eight volts and zero volts, but is one hundred and eighty degrees out of phase with the signal 241. In the preferred embodiment, activation of the light emitting means is linked to the signal 241, with a plurality of regions 244 indicating the periods when the capacitor 114 is discharging and a plurality of regions 248 indicating the periods when the capacitor 114 is charging.

Referring to FIG. 1, the functioning of the high voltage message waiting circuit 10 can be explained. A message waiting signal (such as the signal 180 shown in FIG. 2) is generated by the PBX 46 and is directed to the message waiting circuit by the leads 38 and 42. The leads 39 and 43 provide electrical connection between the leads 38 and 42 and the nodes 62 and 146, respectively, and therefore function as input means for receiving the message waiting signal from the PBX 46.

When the potential across Zener diode 156 is greater than 68 volts, diode 156 conducts electricity and allows the potential at the node 160 to go high. Thus, the Zener diode 156 functions as a voltage sensing means. When the potential at the node 160 is high, the transistor 70 turns on, thereby allowing the capacitor 114 to begin charging. When the signal 180 returns to point 196 (i.e. about 68 V), the transistor 70 turns off. This causes the potential at the node 92 to go high, thereby turning on the transistors 78 and 82 (i.e. turning on the second circuit means 22). When the second circuit means 22 is on, the capacitor 114 discharges and causes the LED 34 to emit light.

When the next periodic message waiting signal 180 appears across the leads 38 and 42, the transistor 70 turns back on causing the potential at the node 92 to go low and turn off the transistors 78 and 82 in the second circuit means. The capacitor charging/discharging cycle is then repeated. The effect of the capacitor charging/discharging cycle is that the LED 34 flashes on and off in response to the message waiting signal 180, with the flash of the LED occurring during the period when the capacitor 114 is discharging. This is the period when the message waiting signal is between minus 68 volts and minus 48 volts as is shown by the curve 188 in FIG. 2(b).

The purpose of the first circuit means 18 is to provide a switch that: 1) allows the energy storage means 26 (i.e. the capacitor 114) to charge during the high voltage (high energy) portion of the message waiting signal 180 (i.e. between the points 192 and 196); and 2) provides isolation between the leads 38 and 42 and the energy storage means 26 during the low voltage (low energy) portion of the message waiting signal 180 (i.e. along the region 204). It is at this time that the capacitor 114 is discharging which in turn lights the LED 34. This first circuit means 18 is important for several reasons.

First, the transistor 70 and the Zener diode 156 function together to ensure that the capacitor 114 does not draw any current from the message waiting signal 180 when the signal 180 has a value outside a predetermined limit. In the preferred embodiment, the transistor 70 and the Zener diode 156 are selected so that the transistor 70 is off when the signal 180 is between minus 48 and minus 68 volts. This is important when a plurality of the phone sets 210 are connected to the leads 38 and 42. If too much current is pulled from the message waiting signal 180 when the signal first appears, the PBX 46 interprets this as an "off hook" condition (i.e. the PBX 46 thinks a phone has been answered) and the message waiting signal 180 will be terminated. By waiting to begin charging the capacitor 114 until the signal 180 reaches about minus 68 volts, approximately 15 to 18 telephone sets 210 can be connected to the leads 38 and 42. Additionally, since the LED 34 is a low voltage device, the capacitor 114 does not require a large capacitance (typically only about ten microfarads).

Second, when the signal 180 has passed and the potential between the leads 38 and 42 goes back into the minus 68 volt to minus 48 volt range, the transistor 70 turns off. This electrically isolates the energy storage means 26 from the leads 38 and 42. The electrical isolation allows the capacitor 114 to discharge without a signal caused by the discharging capacitor 114 to be transmitted onto the leads 38 and 42.

The purpose of the first switch means 50 is to allow the circuit 10 to be used when the PBX 46 is the type that generates a pulsed message waiting signal such as the signal 230. The switch means 50 is a switch that allows an electrical connection to be made between the contacts 52 and 53. When this electrical connection is established, the influence of the first circuit means 18 is removed from the circuit 10. The signal 230 enters the rectifier means 14 and the capacitor 114 charges whenever the lower part 238 of the signal 230 is present. When the upper part 234 of the signal 230 is present, the second circuit means 22 turns on and allows the capacitor 114 to discharge. As described previously, when the capacitor 114 discharges, the LED 34 lights up.

The purpose of the second switch means 54 is to allow the circuit 10 to be used when the PBX 46 is the type that generates a reversed polarity message waiting signal such as the signal 240. The switch means 54 is a switch which allows an electrical connection to be made between the contacts 55 and 56. When this electrical connection is established, the influences of the first circuit means 18 and the negative terminal 59 of the rectifier means 14 are removed from the circuit 10. The signal 241 charges the capacitor 114 when the regions 248 are present (i.e. when the potential difference between the positive terminal 60 and the RING lead is about forty-eight volts). The capacitor 114 discharges when the regions 244 are present (i.e. when the potential difference between the positive terminal 60 and the RING lead is about zero volts). As described previously, when the capacitor 114 discharges, the LED 34 lights up.

The third switch means 172 allows the second switch means 54 to be used regardless of the polarity of the leads 38 and 42. If the message waiting circuit 10 is connected so that the signal 241 comes in on the lead 39 and the lead 43 is ground, then the switch means 172 is set so that the contacts 174 and 175 are electrically connected (as shown in FIG. 1). If the PBX 46 is configured so that the signal 241 comes in on the lead 42 and the lead 38 is ground, then the switch means 172 is set so that the contacts 171 and 175 are electrically connected.

The purpose of the rectifier means 14 is to allow the circuit 10 to be used regardless of the polarity of the leads 38 and 42. For example, because of the rectifier means 14, it doesn't matter if the message waiting signal 180, 230 or 240 appears on the TIP lead 38 or on the RING lead 42. Either situation will work equally well on the message waiting circuit 10. Additionally, it should be noted that the 48V and 120V values are not essential. By convention, a telephone signal is usually at minus 48V. However, in different situations, other values could be used. Similarly, the message waiting signal could be greater than or less than the 120 V value.

The purpose of the diode 116 is to allow the second circuit means 22 to turn on and discharge the capacitor 114 when the first circuit means 18 is switched off. The purpose of the Zener diode 124 is to clamp the capacitor 114 at about minus 56 volts so that it doesn't overcharge, thus preventing excessive current through the LED 34 during the discharge period 188 of the capacitor 114.

The purpose of the second circuit means 22 is to provide a circuit element that causes the energy storage means 26 to discharge when the potential of the circuit 10 moves beyond a certain predetermined limit. In the preferred embodiment, the transistors 78 and 82 turn on when the message waiting signal 180 reaches voltage point 196 (shown in FIG. 2(a)), thereby permitting the capacitor 114 to discharge through the LED 34. In the preferred embodiment, the second circuit means 22 comprises the two transistors 78 and 82 connected in a configuration known as a Darlington transistor. The purpose of the Darlington transistor configuration is to provide high gain to discharge the capacitor 114 completely and quickly, so as to provide maximum brightness from the LED 34. In the preferred embodiment, the LED 34 is a high intensity LED that requires very little power to cause it to emit highly visible light. For example, a commercially available LED (Gallium Aluminum Arsenide red light emitting diode) obtained from Liteon, of 720 S. Hillview Drive, Milpitas, Calif. 95035, part number 4268UR, functions satisfactorily as the LED 34.

The reason for the circuit 10 is to allow many phone sets 210 to be connected in parallel to the leads 38 and 42 as is illustrated in FIG. 3. This is desirable in situations, such as in a hotel or motel suite, where four or more telephone sets are needed and each telephone set has its own message waiting light. The circuit 10 allows multiple phones with message waiting lights to work on a single line because the length of time it takes for the capacitor 114 to charge is less than the period of the message waiting signal. This means that the capacitor 114 only utilizes a fraction of the power available in the message waiting pulse, and that sufficient power remains in the message waiting pulse to charge the capacitors in the "n" other message waiting circuits 10 attached to the lead 38.

By utilizing the design of the message waiting circuit 10, between 10 and 25 phones can be connected in parallel and still have the LED 34 on each phone emit a bright light in response to the message waiting signal, thereby indicating that a message is waiting for the party occupying the hotel or motel suite. Typically, the circuit 10 will support at least ten phones when a high voltage DC message waiting signal (e.g. the signal 180) is used, and it is estimated that as many as eighteen phones could be connected and still have the light source 30 function properly. Similarly, when an AT&T type pulsed message waiting signal is used; or when a Northern Telecom type reverse polarity message waiting signal is used, it is estimated that between ten and twenty-five phones may be connected and still have the light source 30 function properly.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A message waiting circuit comprising:
   input means for receiving a message waiting signal from a PBX system, the message waiting signal indicating that a message is waiting for a user of a telephone set;
   energy storage means for storing electrical energy extracted from the message waiting signal;
   first circuit means for allowing the energy storage means to charge when the message waiting signal is within a first predetermined range and for isolating the energy storage means from the input means when the message waiting signal is within a second predetermined range;
   second circuit means for allowing the energy storage means to discharge when the message waiting signal is within a third predetermined range; and
   signaling means for emitting a signal when the energy storage means discharges, thereby indicating that the message is waiting for the user.

2. The message waiting circuit of claim 1 wherein the first circuit means comprises a transistor.

3. The message waiting circuit of claim 1 wherein the second circuit means comprises a Darlington transistor.

4. The message waiting circuit of claim 1 wherein the energy storage means comprises a capacitor.

5. The message waiting circuit of claim 1 wherein the input means comprises a pair of leads adapted for electrical connection to the PBX system.

6. The message waiting circuit of claim 1 wherein the signaling means comprises a light emitting diode.

7. The message waiting circuit of claim 1 wherein the third predetermined range is equal to the second predetermined range.

8. The message waiting circuit of claim 1 wherein the first predetermined range is between approximately minus sixty-eight volts and approximately minus one hundred and twenty volts and the second predetermined range is between approximately minus sixty-eight volts and approximately minus forty-eight volts.

9. The message waiting circuit of claim 1 wherein the second circuit means comprises at least one transistor.

10. The message waiting circuit of claim 1 further comprising a rectifier means for rectifying the message waiting signal before it reaches the first circuit means.

11. The message waiting circuit of claim 10 further comprising a first switch means electrically connected between the rectifier means and the second circuit means for allowing the first circuit means to be electrically bypassed when the first switch means is on.

12. The message waiting circuit of claim 10 further comprising a second switch means for allowing the message waiting signal to bypass the first circuit means and a terminal of the rectifier means when the second switch means is on.

13. The message waiting circuit of claim 1 further comprising a voltage sensing means for turning on the first circuit means when the message waiting signal is within the first predetermined range.

14. The message waiting circuit of claim 13 wherein the voltage sensing means comprises a Zener diode.

15. The message waiting circuit of claim 1 further comprising a charge control means for preventing the energy storage means from overcharging.

16. The message waiting circuit of claim 15 wherein the charge control means comprises a Zener diode.

17. A telephone system comprising:
   a plurality of individual telephone sets connected in series to a PBX system; and
   a plurality of message waiting circuits, with at least one of the message waiting circuits being associated with each of the individual telephone sets and with each message waiting circuit comprising:
      receiving means for receiving a message waiting signal from the PBX system, the message waiting signal indicating that a message is waiting for a user of the individual telephone set;
      energy storage means for storing electrical energy extracted from the message waiting signal;
      first circuit means for allowing the energy storage means to charge when the message waiting signal is within a first predetermined range and for isolating the energy storage means from the receiving means when the message waiting signal is within a second predetermined range;
      second circuit means for causing the energy storage means to discharge when the message waiting signal is within a third predetermined range; and
      signaling means for emitting a signal when the energy storage means discharges, thereby indicating that the message is waiting for the user.

18. The message waiting circuit of claim 17 wherein the signaling means comprises a light emitting diode.

19. The message waiting circuit of claim 17 wherein the third predetermined range is equal to the second predetermined range.

20. The message waiting circuit of claim 17 wherein the plurality of individual telephone sets comprises five or more individual telephone sets.

21. A message waiting circuit comprising:
   a pair of leads adapted for electrical connection to a PBX and for receiving a message waiting signal from the PBX, the message waiting signal indicating that a message is waiting for a user of a first telephone set;

a capacitor for storing electrical energy extracted from the message waiting signal;

a first transistor for allowing the capacitor to charge when the message waiting signal is within a first predetermined range and for electrically isolating the capacitor from the pair of leads when the message waiting signal is within a second predetermined range;

a Darlington transistor for causing the capacitor to discharge; and a light emitting diode which emits light when the capacitor discharges, thereby indicating that the message is waiting for the user.

* * * * *